Figure 1:
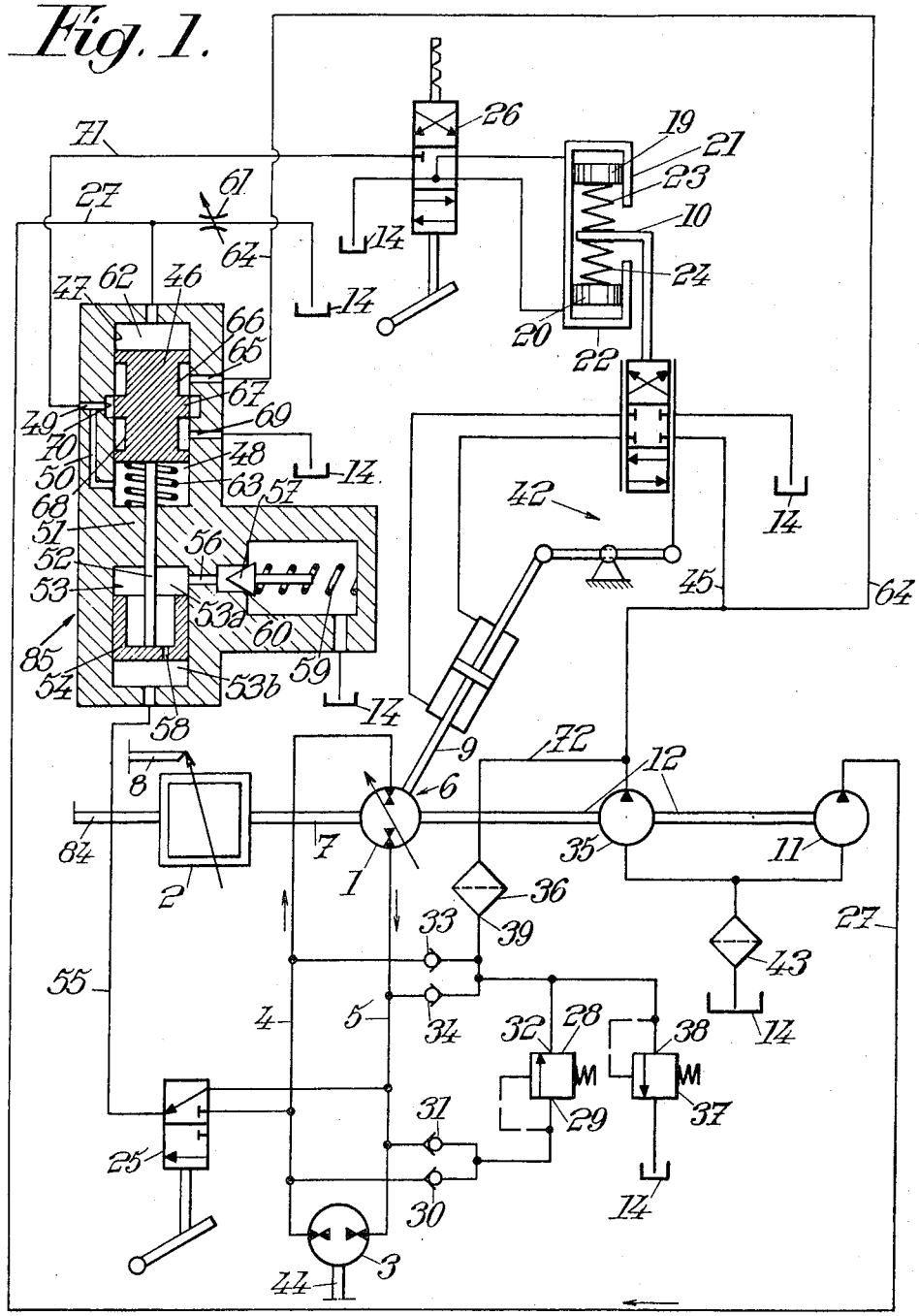

United States Patent

Isaac

[15] 3,672,166
[45] June 27, 1972

[54] VARIABLE RATIO HYDROSTATIC TRANSMISSIONS

[72] Inventor: Olivier Isaac, Lyon, France

[73] Assignee: Societe Industrielle Generale de Mecanique Appliquee S.I.G.M.A., Paris, France

[22] Filed: Sept. 25, 1970

[21] Appl. No.: 75,343

[30] Foreign Application Priority Data

April 8, 1970 France..................................7012759

[52] U.S. Cl.............................................60/53 R, 60/52 VS
[51] Int. Cl................................................F16d 31/06
[58] Field of Search...................60/19, 53 R, 53 A, 52 VS

[56] References Cited

UNITED STATES PATENTS 2,932,948  4/1960  Neff et al. .............................60/52 VS
2,976,685  3/1961  Thoma et al. ..........................60/53 A
3,003,309  10/1961  Bowers et al. .......................60/53 R X
3,167,907  2/1965  Kempson.............................60/53 R X
3,302,390  2/1967  Christenson et al................60/53 R X Primary Examiner—Edgar W. Geoghegan
Attorney—Waters, Roditi, Schwartz & Nissen

[57] ABSTRACT

The hydrostatic transmission comprises a hydraulic motor as well as a pump of which the cubic capacity is regulated by a mechanism sensitive to the pressure of a liquid. This liquid is supplied by a pressure regulator on the movable member of which act, in the sense tending to increase the pressure, a force increasing with the speed of the pump and, in reverse sense, a force increasing with the resistant couple applied to the motor and a force proportional to said pressure. The transmission is useful for automobiles.

10 Claims, 5 Drawing Figures

VARIABLE RATIO HYDROSTATIC TRANSMISSIONS

The invention relates to improvements in hydrostatic transmissions of the type which comprise a generator machine (or pump) driven by a motor (thermal or electric, for example), at least one receiver machine (or hydraulic motor) mechanically coupled to a driving member capable of being subjected to variable external forces, two pipes arranged in closed circuit between the generator and receiver machines and a mechanism adapted to vary the unit flow of the generator machine, that is to say flow per revolution of the shaft of this machine.

The present improvements supplement those which have been disclosed in French Pat. No. 1590694 of Sept. 20, 1968 and which consisted, principally, in order to maintain automatically equality between the torque actually supplied by the motor and the torque which it can supply — and at the same time in controlling the above-said mechanism by means sensitive to the pressure of a liquid — in providing an auxiliary circuit adapted to supply the said liquid under a pressure varying in the same sense as the speed of the generator machine and in reverse sense from the value of the external forces, the assembly being such that, whatever the value of the external forces, the torque absorbed by the generator machine is substantially equal to the torque which can be supplied by the motor that drives it.

The invention relates more particularly, because it is in this case that its application seems to offer the most advantage but not exclusively, among these hydrostatic transmissions, to those which are mounted on automobile vehicles, the driving member being then a drive wheel (or a group of drive wheels) of the vehicle.

According to the embodiment of the aforesaid patent, the auxiliary circuit is constituted by a pump coupled mechanically to the generator machine and circulating the liquid through a throttle with adjustable opening actuated by second means sensitive to the pressure existing in that one of the above-said pipes which joins the inlet of the receiver machine to the delivery of the generator machine, the liquid adapted to actuate the first above-said means being taken upstream of the said throttle.

To protect the closed circuit constituted by the two abovesaid pipes against excessive pressure, there is provided, according to this embodiment, a pressure limiter of which the inlet is connected respectively to these pipes by not-return valves and of which the outlet is also connected to each of them by other non-return valves. When the pressure in one of the pipes exceeds the calibration value of the pressure limiter, the latter allows liquid to pass which is reintroduced into the other pipe. As the volume of liquid circulating between the generator and receiver machines is small, it is apparent that the heating of the liquid due to its shearing by the pressure limiter risks brining its temperature to an unacceptable value. It is a particular object of the invention to overcome this drawback.

To this end, the hydrostatic transmission according to the invention comprises: a generator machine (or pump) driven by a motor (thermal or electric, for example); at least one receiver machine (or hydraulic motor) coupled mechanically to a driving member capable of being subjected to variable external forces; two pipes arranged in closed circuit between the generator and receiver machines; a mechanism adapted to vary the unit flow of the generator machine, that is to say the flow per revolution of the shaft of this machine; control means for the above-said mechanisms sensitive to the pressure of a liquid; and an auxiliary circuit adapted to supply the said liquid under a pressure varying in the same sense as the speed of the generator machine and in reverse sense to the value of the external forces. The assembly is such that, whatever the value of the external forces, the torque absorbed by the generator machine is substantially equal to the torque which can be supplied by the motor which it drives. It is characterized by the fact that the auxiliary circuit comprises a source of liquid under pressure connected to a pressure reducer on a movable member on which act, in the sense tending to increase the output pressure of the regulator, a force increasing with the speed of the generator machine and, in the opposite sense, a force increasing with the value of the external forces as well as a force proportional to the said outlet pressure, the above-said control means being sensitive to this output pressure. The said movable member can be urged, in addition, by a spring acting in the same sense as these two latter forces.

Preferably, the movable member of the pressure reducer is constituted by a slide capable of sliding in a cylinder in which it limits, by one of its ends, a first fluidtight chamber of variable volume connected to the output of the pressure reducer so that this slide is thus subjected to the above-said force proportional to the output pressure, the bottom of this first chamber being traversed by a rod which emerges in a second fluidtight chamber which is connected to that of the abovesaid pipes which joins the inlet of the receiver machine to the delivery of the generator machine, so that this rod receives and transmits to the slide the above-said force increasing with the value of the external forces. In this case, the second chamber advantageously receives a sliding piston which separates therein two compartments into which open respectively a connection with the abovesaid pipe and an outlet towards a pressure limiter valve, a passage of restricted section communicating between them these two compartments; this passage preferably traversing the piston itself.

The force increasing with the speed of the generator machine and acting on the slide of the pressure reducer can be created by a pump driven mechanically by the generator machine or its motor and delivering in parallel at a calibrated leak orifice and at a third fluidtight chamber bounded inside the above-said cylinder by the other end of the slide. In a first embodiment, the said force can be created by a centrifugal regulator driven mechanically by the generator machine or its motor and adapted to act by thrust on this other end of the slide. In a second variation, the said force can be created by the difference of the pressures existing respectively upstream and downstream of a restricted orifice or choke provided on the delivery pipe of a pump driven by the above-said motor, the downstream portion of this pipe being provided with a pressure limiter adapted to maintain, in this delivery pipe, a continuous circulation of liquid under pressure.

Finally, when the transmission comprises at least two generator machines driven by a single motor, each generator machine being associated in closed circuit with a receiver machine and possessing its individual mechanism for variation of its unit flow, the above-said rod possesses as many shoulders of identical sections as there are generator machines and the said second chamber is subdivided into as many partial chambers with which these shoulders co-operate and which are connected respectively to those of the above-said pipes which join the intakes of the receiver machines to the deliveries of the corresponding generator machines.

The invention will, in any case, be well understood with the aid of the supplementary description which follows as well as of the accompanying drawings, which supplement and drawings relate to preferred embodiments, given purely by way of non-limiting illustration.

Figure 2:
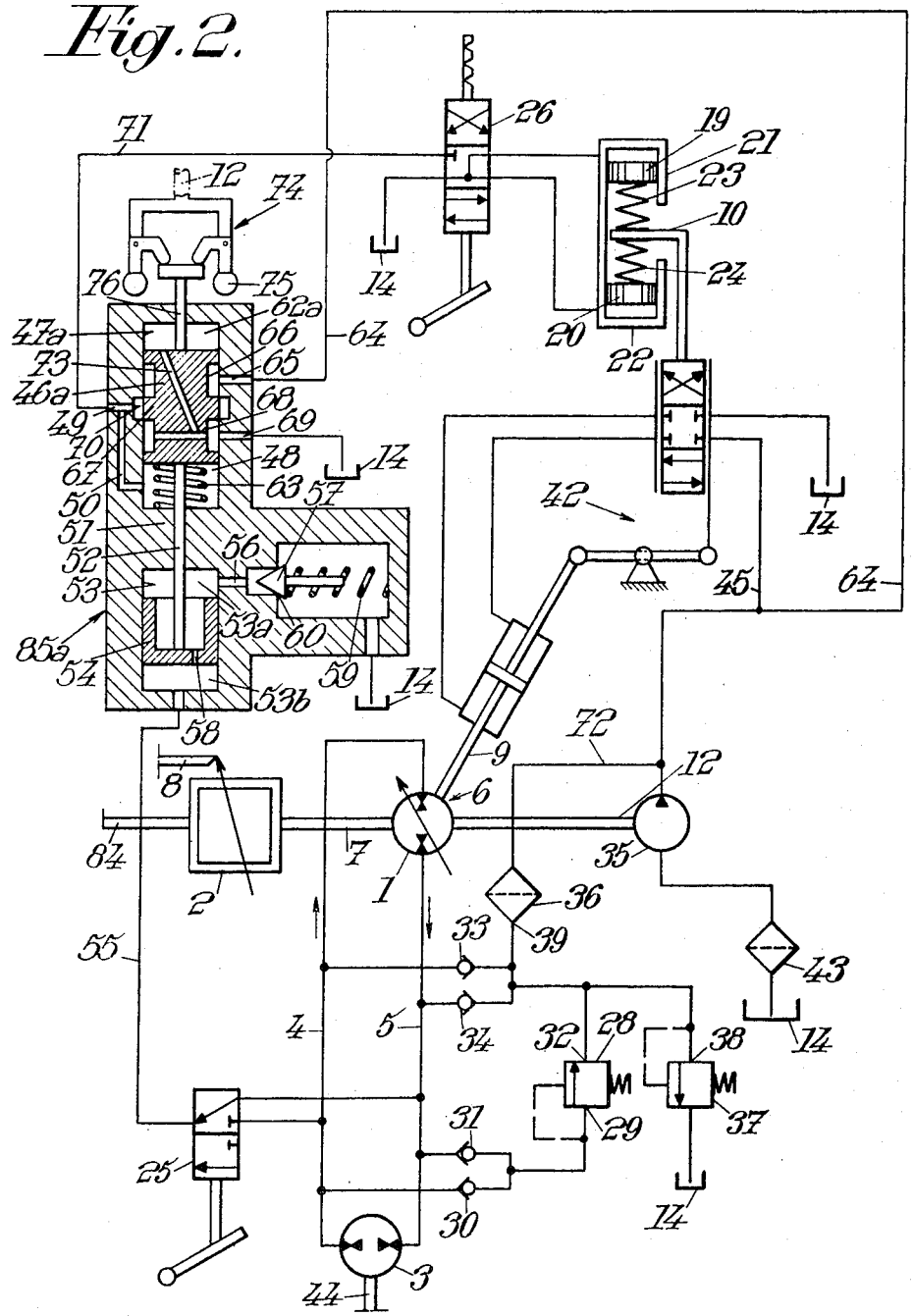
Figure 3:
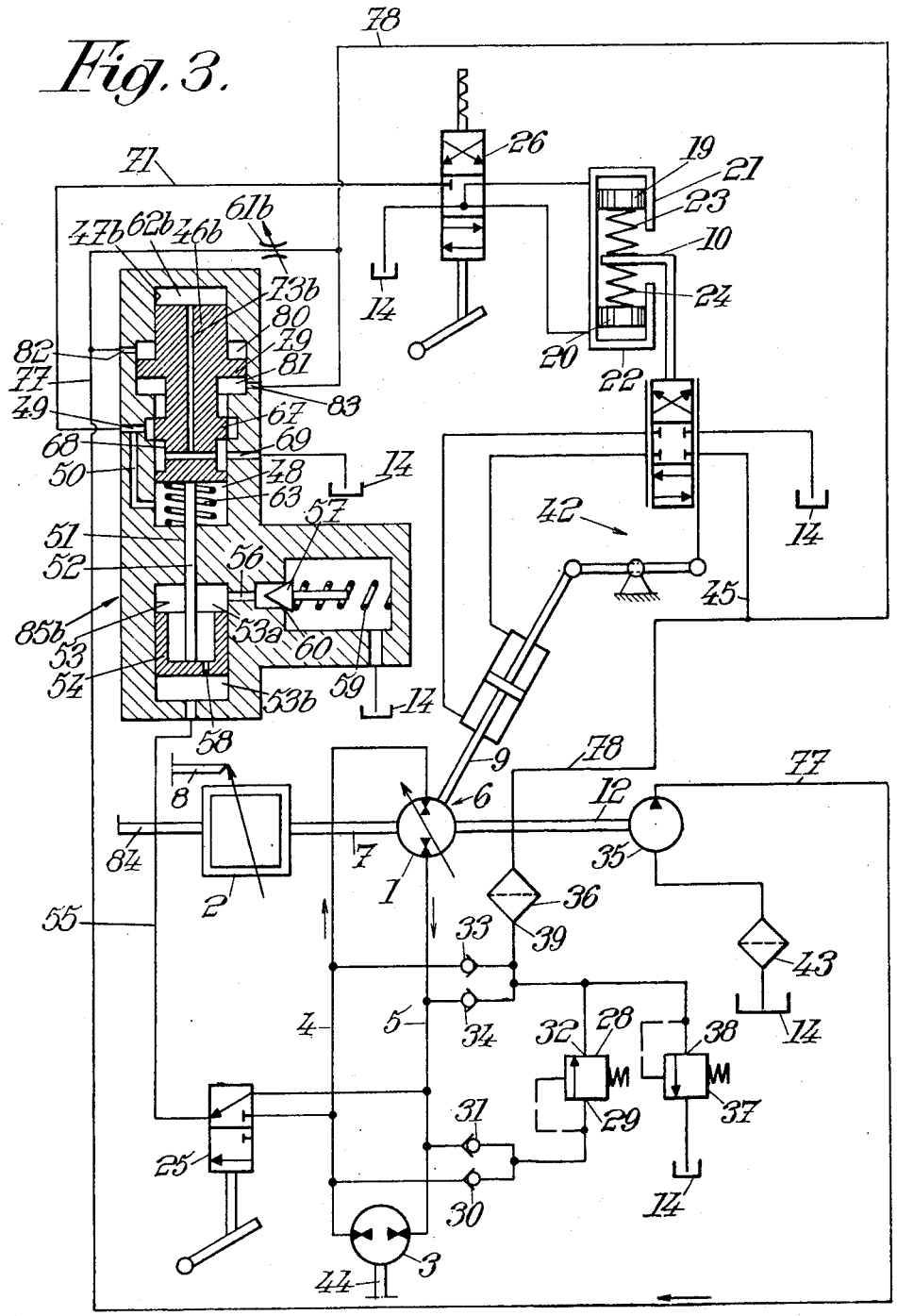

FIGS. 1 to 3 of these drawings show respectively, in diagrammatic manner, three embodiments of hydrostatic transmissions constructed according to the invention.

Figure 4:
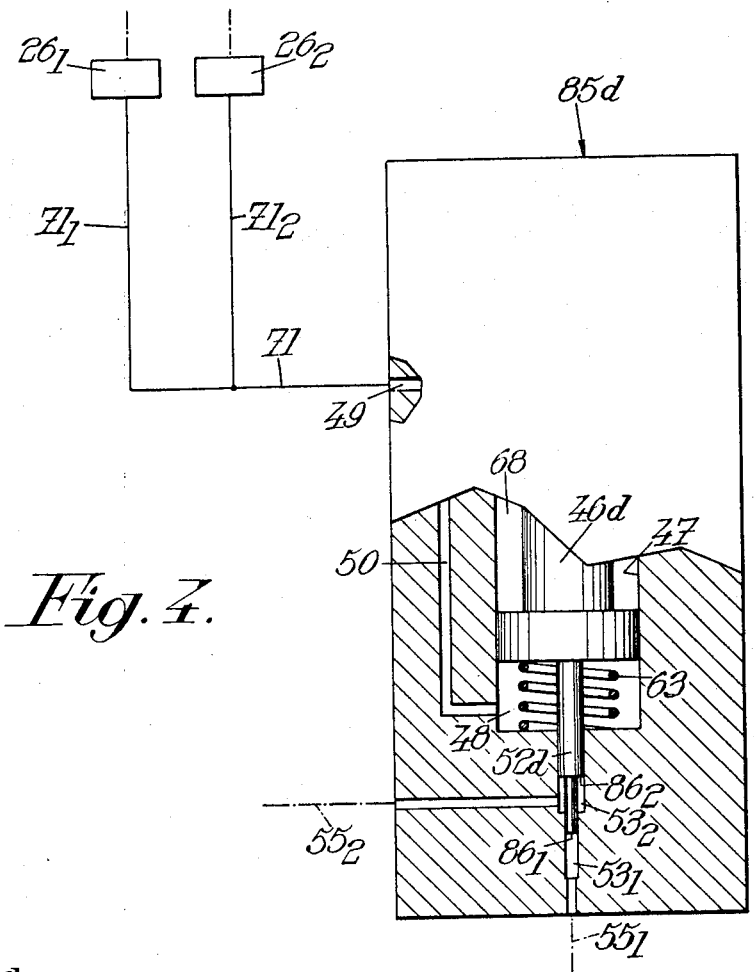

FIG. 4 shows a variation of a detail of each of the embodiments in the preceding figures.

Figure 5:
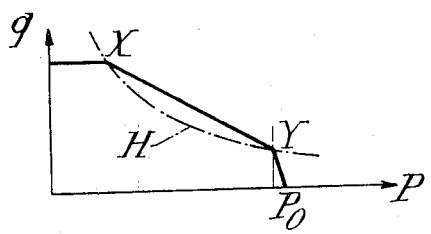

FIG. 5, lastly, illustrates, by curves, the operation of the embodiment of the hydrostatic transmission of FIG. 1.

In order to construct a hydrostatic transmission for an automobile vehicle, procedure is as follows or in similar manner.

As regards the hydrostatic transmission as a whole, it is made to include, as shown in FIGs. 1 to 3, a generator machine (or pump) 1 driven by a motor 2, a receiver machine (or hydraulic motor) 3 mechanically coupled by its shaft 44 to a driving member (constituted by a wheel, not shown, of the vehicle), capable of being subjected to variable external forces, two pipes 4 and 5 arranged in a closed circuit between the generator and receiver machines 1 and 3, and a mechanism 6 adapted to cause the unit flow of the generator machine to vary, that is to say the flow per revolution of the drive shaft 7 of this machine.

The motor 2 can be a Diesel engine or an internal combustion engine possessing a control such as a pedal 8, on which the driver can act to determine, according to the type of supply of the motor 2, the torque provided by this motor or the speed of the drive shaft 7.

Numerous solutions are known for constituting the abovesaid mechanism, the generator machine 1 can be, for example, a pump with axial pistons whose strokes have amplitudes adjusted by the angular piston of a cam forming the essential portion of this mechanism, which position is fixed, for example, by that of a movable rod 9.

The mechanism 6 is controlled by means sensitive to the pressure of a liquid and there is provided an auxiliary circuit adapted to supply the said liquid under a pressure varying in the same sense as the speed of the generator machine 1 and in reverse sense of the value of the above-said external forces, the assembly being such that, whatever the value of these forces, the torque absorbed by the generator machine 1 is substantially equal to the torque which can be supplied by the motor 2.

According to the present improvements, the auxiliary circuit comprises a source of liquid under pressure connected to a pressure reducer 85, 85a or 85b on the movable member 46, 46a or 46b on which act, in the sense (downward of FIGS. 1 to 3) tending to increase the output pressure $p$ of the regulator, a force $F_N$ increasing with the speed of the generator machine 1 and, in the opposite sense, a force F increasing with the value of the external forces as well as a force $f$ proportional to the said output pressure $p$, the above-said means being sensitive to this output pressure. The said movable member 46, 46a or 46b can be urged moreover by a spring 63 acting in the same sense as these two last forces F and $f$.

Preferably, the movable member 46, 46a or 46b of the pressure reducer is constituted by a slide valve capable of sliding in a cylinder (or jacket) 47, 47a or 47b in which it limits, by one of its ends, a first fluidtight chamber 48 of variable volume connected to the output 49 of the pressure reducer by a passage 50 so that this slide valve is thus subjected to the above-said force $f$ proportional to the output pressure $p$, the bottom 51 of this chamber 48 being traversed by a rod 52 which emerges in a second fluidtight chamber 53 of variable volume which is connected to that of the above-said pipes 4, 5 which joins the inlet of the receiver machine 3 to the delivery of the generator machine 1, so that this rod 52 receives and transmits to the slide valve 46, 46a or 46b the above-said force F increasing with the value of the external forces, that is to say with the pressure existing in the said piping. The spring 63 can be a helicoidal spring arranged around the portion of the rod 52 which occurs in the first chamber 48. The second chamber 53 advantageously receives a sliding piston 54 which separates therein two compartments 53b and 53a into which open respectively a pipe 55 connected to the above-said pipe 4 or 5 and a passage 56 ending at a pressure limiting valve 57, a passage of restricted section 58 forming communication between them of the two compartments 53a and 53b. The passage 58 preferably passes through the piston 54 itself, as shown in FIGS. 1 to 3. The valve 57, which is urged by a spring 59, co-operates with a seat 60 of which the downstream portion communicates with a reservoir 14 which has been represented at several places in FIGS. 1 to 3 for reasons of clarity.

According to the embodiment of FIG. 1, the force $F_N$ increasing with the speed of the generator machine and acting on the slide valve 46 of the pressure reducer 85 is created by a pump 11 mechanically coupled to the generator machine 1 by a shaft 12, which pump sucks liquid in the reservoir 14 and circulates it through a pipe 27 connected in parallel on a calibrated escape orifice 61, preferably adjustable, and on a third fluidtight chamber 62 limited, inside the cylinder 47, by the end of the slide valve 46 other than that which limits the chamber 48.

The abovesaid source of liquid under pressure is then constituted by pump 35 mechanically coupled to the generator machine 1 or to the motor 2 by the shaft 12, the delivery pipe 64 of this pump opening into the cylinder 47 through an orifice 65 which is situated facing a neck 66 belonging to the slide 46. The neck 66 is separated, by a solid portion or collar 67, from a second neck 68 connected permanently to the reservoir 14, through the orifice 69 passing through the wall of the cylinder 47. The collar 67 co-operates with a groove 70 arranged in the said wall and communicating with the outlet 49 of the pressure reducer. It is clear that, the more the slide valve 46 drops (according to the illustration of FIG. 1), the larger is the passage left free by the collar 67 between the neck 66 of the slide 46 and the groove 70 of the cylinder 47 and the higher the output flow from the regulator.

In a first embodiment, it is assumed firstly that the generator machine 1 is of the irreversible type, the sense of circulation of fluid between the machines 1 and 3 being hence invariable (sense indicated by arrows in FIG. 1). The pipe 5 then joins permanently the intake of the receiver machine 3 to the delivery of the generator machine 1. There is also indicated by an arrow the sense of circulation in the pipe 27.

According to this first solution, control means of the mechanism 6, sensitive to the pressure of the liquid of the auxiliary circuit, are constituted by a piston 19 adapted to slide in fluidtight manner in a cylinder 21 which is connected to the output 49 of the pressure reducer 85 through a pipe 71, the said piston being subject to an elastic return member 24 constituted for example by a spring.

To put the above-said means out of action, it is advantageous to interpose between the pipe 71 and the cylinder 21 a distributor 26 adapted, in a first position, to isolate the cylinder 21 from the said pipe and, in a second position, to connect the cylinder 21 to the pipe 71.

To protect the closed circuit constituted by the pipes 4 and 5 from excessive pressures, there can be provided a pressure limiter 28 (calibrated for example to a value comprised between 300 and 400 bars) whose input 29 is connected to pipes 4 and 5 respectively through non-return valves 30 and 31 and of which the outputs 32 can be connected to pipes 4 and 5 respectively by non-return valves 33 and 34, so that too high a pressure in one of the pipes 4 and 5 results in a outflow of liquid, through the opening of the limiter 28 and of the corresponding valve 30 or 31 and, possibly, a return of this same liquid into the other of these pipes, by the opening of the valve 34 or 33.

In order to keep the whole of the pipes 4 and 5 and of the machines 1 and 3 full of liquid, the delivery pipe 64 from the pump 35, is connected by a branch 72, to the pipes 4 and 5 through a filter 36 and the valves 33 and 34. The pump 35 is protected against excessive pressures by a pressure limiter 37 whose input 38 is connected to the output 39 of the filter 36. The output 32 of the pressure limiter 28 can also be connected to this input 38. The pump 35 lifts the liquid in the reservoir 14 through a filter 43 which can serve also for the pump 11.

The movement of the piston 19 is preferably communicated to the rod 9 through a rod 10 and a hydraulic force amplifier 42 fed through the pump 35 by means of a pipe 45.

In a second solution, it is assumed now that the generator machine 1 is of the reversible type, the sense of circulation of the liquid between the machines 1 and 3 being either that indicated by the arrows (vehicle advancing), or the reverse sense (vehicle reversing).

In this case, the mechanism 6 is arranged to that it makes the unit flow from the generator machine 1 increase from a value nil corresponding to the intermediate position of the rod 9 which is shown in FIG. 1, the displacement of the rod 9 from this intermediate position in one sense or the other resulting in an increase in the unit flow from the machine 1 towards the pipe 4 or towards the pipe 5.

In addition, the pressure sensitive means are constituted by the assembly of two pistons 19 and 20 adapted to slide in fluid-tight manner respectively in two aligned cylinders 21 and 22, the rod 10 being placed between the two pistons 19 and 20 with the interposition of elastic return members 23 and 24 each constituted for example by a spring, so that the rod 10 can be displaced in one sense or in the other, from an intermediate position (represented in FIG. 1), according as there is made to exist in the cylinder 21 or 22 the pressure existing in the pipe 71, that is to say according as the generator machine recirculates in the pipe 5 (advance) or 4 (reversing). At the same time, it is arranged so that the compartment 53b is connected to that of these two pipes 4 and 5 into which the machine 1 discharges.

To enable suitable connection of cylinder 21 or 22 with the pipe 71, the distributor 26 is advantageously arranged so that it can no longer occupy two positions only as in the previous solution, but three positions, namely a neutral intermediate position (illustrated) for which the cylinders 21 and 22 are connected together to the reservoir 14 by being isolated from the pipe 71 and two active positions for which one of the two cylinders 21 and 22 is connected to the pipe 71 and the other of the cylinders is connected to the reservoir 14.

Finally, to enable suitable connection of the compartment 53b with that of the two pipes 4 and 5 which is required, there is provided a distributor 25 which can be mechanically coupled or combined with the distributor 26.

As a result of which, there is obtained a hydrostatic transmission with a variable ratio whose operation is as follows. In the following only those conditions are considered which are produced when the distributor 26 is in one of its active positions (or in its single active position).

It is assumed, first of all, that the automobile vehicle is stopped, the engine 2 idling, and the driver wishes to advance his vehicle forwards. In the case of the second embodiment considered above, he places the distributor 25 in the position for which the compartment 53b is connected to the pipe 5 and the distributor 26 in the position for which the cylinder 21 is connected to the pipe 71 of the auxiliary circuit and the cylinder 22 to the exhaust.

On idling of the engine, the pressure created by the pump 11 upstream of the throttle 61 and transmitted to the chamber 62 is insufficient to cause the slide valve 46 to be moved downward, so that the pressure at the output 49 of the pressure reducer 85 is nil (in relative value). The generator machine 1 has hence a practically nil unit flow.

From the time when the driver accelerates the engine 2 by depressing the pedal 8, the flow of the pump 11, which is driven at a speed proportional to that of the generator machine 1, increases and the pressure of the liquid in the pipe 27 upstream of the throttle 61 grows, which has the effect of displacing the slide valve 46 of the reducer 85 downwardly in FIG. 1.

The pressure p at the output 49 of the pressure reducer 85 is proportional to the pressure $P_N$ existing in the chamber 62 and inversely proportional to the force transmitter by the rod 52, the pressure $P_N$ being given by the tachymetric pump 11 discharging into the escape orifice or choke 61. The force transmitted by the rod 52 takes two different values according as the valve 57 is closed or not. In the case where the valve 57 is closed, this force is equal to the product of the section of the rod 52 by the delivery pressure P of the generator machine 1 which is transmitted to the compartment 53a through the distributor 25 and the passage 58 of restricted section. In the case where the valve 57 is open, the force transmitted by the rod 52 is increased by the supplementary force exerted on the piston 54 by reason of the loss of load due to the flow of the liquid through the passage 58 to the destination of the channel 56 and of the reservoir 14; this supplementary force is equal to the product of the difference of the pressures existing respectively in the compartments 53b and 53a by the section of the piston 54.

The cubic capacity (or volume delivered per revolution) of the generator machine 1 varies at the same time as the pressure p established in the pipe 71, in the sense determined by the distributor 26. It is assumed that this cubic capacity is thus proportional to the pressure p. This cubic capacity, on one hand, increases proportionally with the pressure $P_N$ in the chamber 62, hence with the loss of tachymetric load in the choke 61, hence with the square of the rotary speed N of the engine 2 and, on the other hand, decreases proportionally with the effort transmitted by the rod 52, hence with the delivery pressure P when it is the first case considered above where the valve 57 is closed. The cubic capacity $q$ of the generator machine 1 is hence equal in this case to:

$$q = aN^2 - bP \qquad (1).$$

In the second case where the valve 57 is open, preceding relationship then becomes:

$$q = aN^2 - cP \qquad (2)$$

with $c > b$.

For a constant rotary speed N, the relationship between $q$ and $P$ illustrated in FIG. 5 will prevail, the segment X—Y, with slope $b$, corresponding to the relationship (1) and the segment YP$o$, of slope $c$, corresponding to the relationship (2). The segment X—Y is very close to equicouple hyperbola H shown in mixed line. The considerable slope $c$ of the segment YP$o$ prevents the delivery pressure P from exceeding the value P$o$ adjustable by the calibration of the valve 57 and hence avoids the throttling of the oil in the pressure limiter 28, provided this latter is calibrated to a value slightly greater than that of the valve 57.

If the speed of rotation N varies, a reduction of this speed with respect to the constant speed considered above results in a reduction in pressure $P_N$ in the chamber 62, hence a displacement of the segment X—Y parallel to itself and towards the origin of the coordinates of FIG. 5, that is to say a reduction of the absorbed torque. The speed of the assembly formed by the engine 2 and the generator machine or pump 1 is stabilized thus to the valve where the torque provided by the engine 2 is equal to the torque absorbed by the generator machine 1. This equilibrium speed is besides adjustable by action on the section of the choke 61. The role of the spring 63 is to stabilize the regulator thus constituted and to increase the precision thereof and to oppose thus the cause of instability such as friction of the slide valve 46 in the cylinder 47 and dynamic effects of the jet to which this slide valve is subjected. Of course, the passage 50, in causing the pressure p to act in the chamber 48, eliminates the influence of the variations of the pressure of liquid supplied by the pump 12 and the pipe 64 to the pressure reducer 85.

In the embodiment of FIG. 2, the tachymetric pump of FIG. 1 and its delivery pipe 27 with choke 61 are eliminated and the chamber 62a is placed at atmospheric pressure through a passage 73 which passes through the slide valve 46a so as to connect the said chamber to the neck 68, which communicates permanently with the reservoir 14. The force $F_N$ increasing with the speed of the generator machine 1 is then created by a centrifugal regulator 74 with weights 75 driven, either by the shaft 12, or directly by the engine 2 at the same speed as the latter or at a directly proportional speed. The weights 75 exert on the slide valve 46a, through a push-rod 76, the force $F_N$ which is proportional to the square of the rotary speed N of the engine 2 and is hence equal to the force $F_N$ exerted hydraulically on the slide valve 46 of the embodiment of FIG. 1. The operation of the transmission of FIG. 2 is hence identical with that of the transmission of FIG. 1 and does not require any supplementary description.

According to the embodiment of FIG. 3, the tachymetric pump 11 of FIG. 1 and its delivery pipe 27 with choke 61 are eliminated and the chamber 62b, as in the case of FIG. 2, is placed at atmospheric pressure by a channel 73b which passes through the slide valve 46b to end in the neck 68. The force $F_N$ increasing with the speed of the generator machine is then created by the loss of load in a restricted orifice or choke 61b to which is connected the delivery pipe of the pump 35, the portions of this pipe located respectively upstream and downstream of the choke 61b being denoted respectively by 77 and 78. To this end, the slide valve 46b possesses a collar of large diameter or shoulder 79 which limits to the inside of the cylinder 47b two chambers 80 and 81 connected respectively to the portions upstream 77 and downstream 78 of the delivery pipe of the pump 35, through orifices 82 and 83 arranged in the cylinder 47b. It is the downstream portion 78 of this delivery pipe which is connected, through the pipe 45, to the hydraulic force amplifier 42 and, to the valves 33,34 and to the input 38 of the pressure limiter 37, which ensures a continuous circulation in the pipe 77, 78 and consequently, the maintenance of a loss of load across the choke 61b. The chamber 80 where the upstream pressure exists is situated above the chamber 81 where the downstream pressure exists so that the force $F_N$ is directed downward in FIG. 3 as explained above, the cross-sections of action on the shoulder 79 in the chambers 80 and 81 being identical. According to this embodiment as in the preceding ones, the force $F_N$ is proportional to the square of the rotary speed N of the engine 2 and the operation is hence the same as that of the transmission of FIG. 1.

In the case where the engine 2 drives two or several generator machines or pumps such as 1 each feeding a receiver machine 3 through a closed circuit with pipes 4, 5, it is advantageous to arrange such an assembly to that the sum of the torques absorbed by the pumps 1 are constant and equal to the available torque supplied by the single engine 2, the individual cubic capacities of the pumps 1 remaining identical or in an invariable ratio.

To this end, recourse is had to a pressure reducer 85d on the slide valve 46d on which act downward (as shown in FIG. 4) a force $F_N$ and, upward, a force due to the output pressure transmitted into the chamber 48 and the force of the spring 63, as in the preceding embodiments. But, instead of a single force F due to the pressure P of the single closed transmission circuit there can be brought to act again, upwardly, many forces $F_1$, $F_2$, etc., due to individual pressures $P_1$, $P_2$, etc. of the individual closed transmission circuits. To this end, there is substituted for the rod 52 of constant section ending in the single chamber 53 of the preceding embodiments, a rod 52d possessing as many shoulders $86_1$, $86_2$, etc. of identical section situated respectively in chambers $53_1$, $53_2$, etc., connected to the pipes $55_1$, $55_2$, analogous to the pipes 55 of the preceding embodiments, each pipe $55_1$, $55_2$ belonging to a closed transmission circuit such as 1, 3, 4, 5. The outlet pipe 71 from the pressure reducer 85d is subdivided into branches such as $71_1$, $72_2$ which, through distributors such as $26_1$, $26_2$, are connected to cylinders 21 and 22 of the type described with reference to the preceding figures. As shown in FIG. 4, one of the shoulder, denoted by $86_1$, can be constituted by the end surface of the rod 52d. In the embodiment of FIG. 4, the piston 54 and the valve 57 are eliminated.

In this case, the cubic capacities of the pumps such as 1 are variable but constantly equal between themselves, their common value, deduced from formula (1) above, being:

$$q = aN^2 - b(P_1 + P_2 + \ldots)\qquad(3).$$

The sum of the torque absorbed thus remains constant whatever the external forces on each of the transmissions. The detection of the speed N, when the embodiment is otherwise analogous to that of FIG. 1, is ensured by the pump 35 of any one of the transmissions.

Whatever the embodiment, the invention enables permanent adjustment of the torque absorbed by the external forces to the available torque supplied by the engine 2 and this, in the case of FIGS. 1 and 3, at the speed fixed by the adjustment of the choke 61 or 61b in particular, due to the fact of the tachymetric characteristics of the control device of the transmission. This equilibrium persists in the case of variation of the available torque supplied by the engine 2, whether this is by variation of the performance of the engine 2 or by the absorption of additional torque by another user device (auxiliary force take up 84 for example).

As is self-evident and as emerges already besides from the preceding description, the invention is in no way limited to those of its types of application, nor to those of the embodiments of its various parts which have been more particularly indicated; it encompasses on the contrary, all variations.

I claim:

1. Hydrostatic transmission comprising a generating machine driven by a motor; at least one receiver machine mechanically coupled to one driving member capable of being subjected to variable external forces; two pipes arranged in a closed circuit between the generator and receiver machine; a mechanism adapted to vary the unit flow of the generator machine; control means for said mechanism sensitive to the pressure of a liquid; and an auxiliary circuit adapted to provide said liquid under a pressure varying in the same sense as the speed of the generator machine and in reverse sense to the value of the external forces, the assembly being such that whatever the value of the external forces, the torque absorbed by the generator machine is substantially equal to the torque which the motor that drives it can supply; said auxiliary circuit comprising a source of liquid under pressure connected to a pressure reducer having a movable member on which act, in the sense tending to increase the output pressure of the regulator, a force increasing with the speed of the generator machine and, in the opposite sense, a first force increasing with the value of the external forces, and a second force proportional to said output pressure, said control means being sensitive to said output pressure, said movable member being urgable, in addition, by a spring acting in the same sense as said first and second forces.

2. Hydrostatic transmission according to claim 1, wherein the movable member of the pressure reducer is constituted by a slide valve capable of sliding in a cylinder in which it limits, by one of its ends, a first fluidtight chamber of variable volume connected to the output of the pressure reducer so that said slide valve is thus subjected to said second force, the bottom of said first chamber being traversed by a rod which emerges in a second fluidtight chamber which is connected to that one of said pipes which joins the inlet of the receiver machine to the delivery of the generator machine so that said rod receives and transmits to the slide said first force.

3. Hydrostatic transmission according to claim 2, wherein the second chamber receives a sliding piston which separates therein two compartments in which open respectively a connection with said pipe and outlet towards a pressure limiter valve, a passage of narrow section communicating said two compartments.

4. Hydrostatic transmission according to claim 3, wherein the passage of restricted section passes through the piston itself.

5. Hydrostatic transmission according to claim 2, wherein the force increasing with the speed of the generator machine acting on the slide of the pressure reducer is created by a pump driven mechanically by the generator machine or its motor and discharging in parallel to a calibrated leakage orifice and to a third fluidtight chamber limited inside the said cylinder by the other end of the slide.

6. Hydrostatic transmission according to claim 2, wherein said force increasing with the speed of the generator machine and acting on the slide of the pressure reducer is created by a centrifugal regulator driven mechanically by the generator machine or its motor and adapted to act by thrust on this other end of the slide.

7. Hydrostatic transmission according to claim 2, wherein the force increasing with the speed of the generator machine and acting on the slide of the pressure reducer is created by the difference of pressures existing respectively upstream and downstream of a restricted orifice or choke provided on the delivery pipe of a pump driven by said motor, the downstream portion of said pipe being provided with a pressure limiter adapted to maintain, in said delivery pipe, a continuous circulation of the liquid under pressure.

8. Hydrostatic transmission according to claim 1, which comprises at least two generator machines driven by a single motor, each generator machine being associated in a closed circuit with a receiver machine and possessing its individual mechanism for the variation of its unit flow, wherein said rod possesses as many shoulders of identical sections as there are generator machines and said second chamber is subdivided into as many partial chambers with which said shoulders cooperate and which are connected respectively to those of said pipes which join the inputs of the receiver machines to the deliveries of the corresponding generator machines.

9. Hydrostatic transmission according to claim 3, wherein the force increasing with the speed of the generator machine acting on the slide of the pressure reducer is created by a pump driven mechanically by the generator machine or its motor and discharging in parallel to a calibrated leakage orifice and to a third fluidtight chamber limited inside the said cylinder by the other end of the slide.

10. Hydrostatic transmission according to claim 4, wherein the force increasing with the speed of the generator machine acting on the slide of the pressure reducer is created by a pump driven mechanically by the generator machine or its motor and discharging in parallel to a calibrated leakage orifice and to a third fluidtight chamber limited inside the said cylinder by the other end of the slide.

* * * * *